United States Patent [19]

Stauers

[11] 3,761,636

[45] Sept. 25, 1973

[54] DIAL PULSE REGISTER CIRCUIT

[75] Inventor: Olgerts Stauers, Lakewood, Colo.

[73] Assignee: Western Electric Company, Incorporated, New York, N.Y.

[22] Filed: May 15, 1972

[21] Appl. No.: 253,284

[52] U.S. Cl. .............................................. 179/18 EB

[51] Int. Cl. .............................................. H04q 3/08

[58] Field of Search ................. 179/18 EB, 8 R, 7 R

[56] References Cited

UNITED STATES PATENTS 3,445,605 5/1969 Shirasu et al. .................. 179/18 EB

*Primary Examiner*—Thomas W. Brown
*Attorney*—R. J. Guenther et al.

[57] ABSTRACT

A register circuit is disclosed for connection to stations, interoffice trunks and operator circuits to count and store successively pulsed digits. The circuit comprises a common pulse counting stage which is combined with a different one of a plurality of storage stages prior to receipt of each pulsed digit. The combined stages function as a unitary pulse counter. At the end of each train of pulses the stages are separated leaving the dialed number encoded on operated relays of the storage stage.

13 Claims, 4 Drawing Figures

DIAL PULSE REGISTER CIRCUIT

BACKGROUND OF THE INVENTION

This invention concerns dial pulse register circuitry and more particularly, improved pulse counting and digit registration circuitry.

In the telephone switching art, a pulse register circuit is a special purpose circuit used for temporarily registering call processing information. A register circuit can be selectively connected to calling stations, interoffice trunks and to operator circuits and is customarily capable of registering machine generated as well as rotary dial pulses. The major functions of any pulse register are: (1) to recognize its seizure by a circuit requiring register service, (2) to count and store the successively received digits which are pulsed by the connected circuit, and (3) to read out the stored digits upon request into a call processing common circuit.

The functions of counting and storing digits are accomplished in conventional register circuits by three separate circuit stages. These are the decimal counter stage which connects to the pulse stream for counting each pulse, a memory stage which records the output of the counter stage, and a control stage which jointly effects the transfer of digital information between the aforementioned stages during interdigital intervals and prepares the memory stage for reception of the next digit. These discrete stages are sequentially operated and as a consequence a minimum period must separate each pulse train so as to insure sufficient operate time to transfer the digit information between stages as well as for resetting the memory stage and for restoring the counter circuit to its initial state for subsequent pulse recordings.

It is an object of the present invention to provide an improved as well as a simplified dial pulse register circuit which requires fewer elements per stage to count and to store successively received digits.

It is another object of the invention to provide a counting and storage stage for register circuits which requires less interdigital operate time than conventional register circuits.

SUMMARY OF THE INVENTION

These and other objects of the invention are attained in accordance with an illustrative and preferred embodiment of a dial pulse register circuit in which functions formerly dedicated to separate stages of a register circuit are combined and wherein elements of these stages serve a dual purpose. In accordance with the invention the dial pulse register circuit comprises a common pulse counting stage, a steering stage and a plurality of digit storage stages. Prior to the receipt of a pulse train, the counting stage is combined with one of the storage stages so as to form from the combined stages a decimal pulse counter. Thereafter, pulses of the train are counted and simultaneously stored by the combined counter-digit storage stages. At the end of a pulse train, the combined stages are separated under control of a steering stage leaving the dialed digit information encoded on operated relays of the storing stage and restoring the counting stage to normal. The register circuit is prepared for subsequent pulse trains by combining another one of the digit storage stages with the common pulse counting stage. Accordingly, the time-consuming sequential operation of receiving, transferring and recording dial digit information as in conventional registers is eliminated and replaced with a multifunction stage. In addition, as the need for transferring digital information between a counter and a memory has been eliminated, the interdigital period required to reset the register circuit has been minimized. Moreover, the counting stage is simplified and requires fewer elements since storage stage relays are combined with the counting stage to form a decimal counter.

It is a feature of this invention that each digit recording stage to be integratable with the pulse counting stage so as to form a unitary pulse counter by combining these stages.

It is another feature of this invention to encode digital information on relays of the storage stage while pulses are being simultaneously counted by the combined stages.

BRIEF DESCRIPTION OF THE DRAWING

These and other objects and features of the invention will become more apparent upon a reading of the following description thereof taken in conjunction with the drawing in which:

FIG. 2 illustrates a portion of the digit storage stage capable of recording a four-digit dial code;

FIG. 4 illustrates the manner in which FIGS. 1 through 3 are to be organized to describe the present invention.

GENERAL DESCRIPTION

Figure 1:
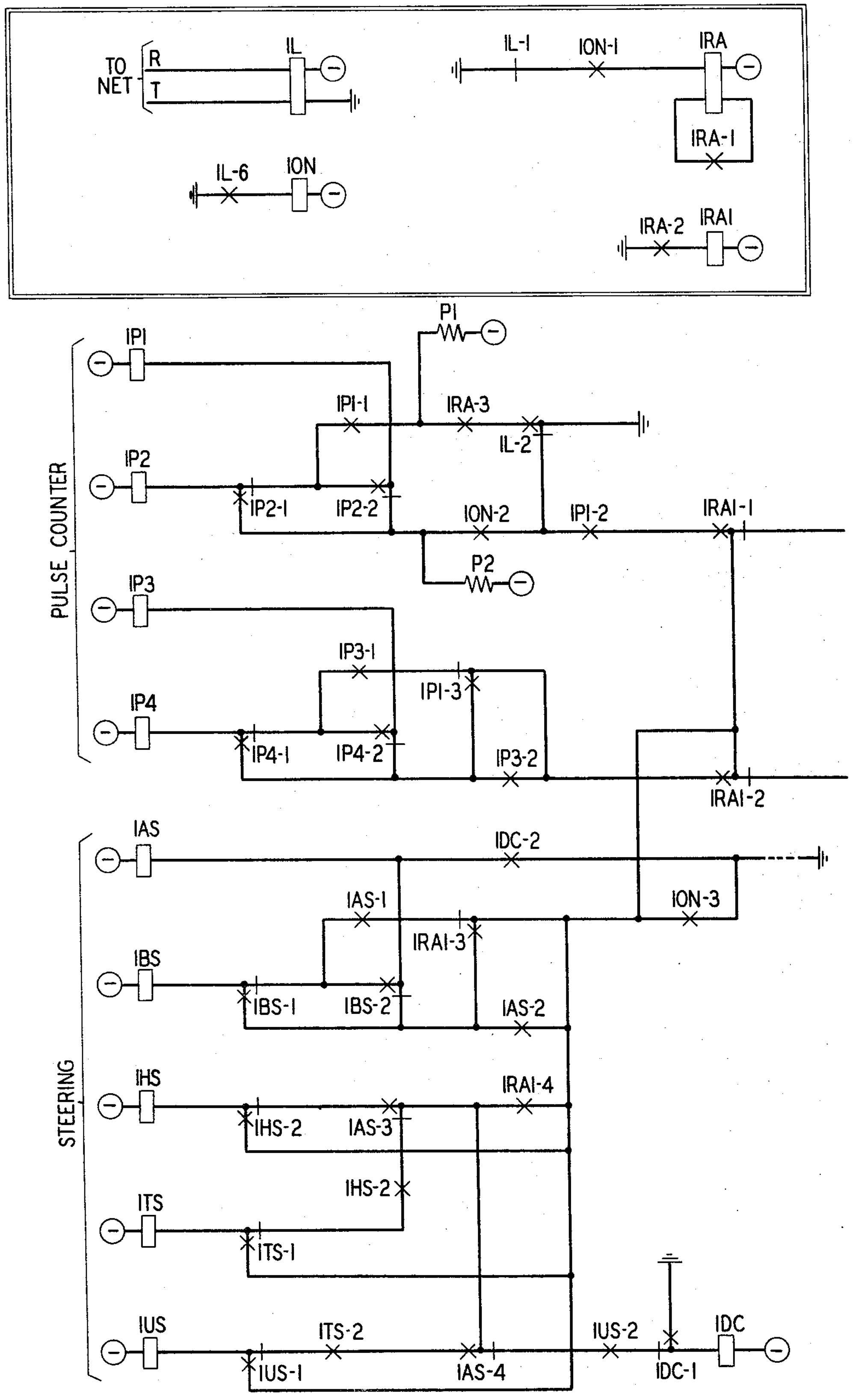
FIG. 1 illustrates the common pulse counter stage and steering stage of the present invention.
Figures 2, 4:
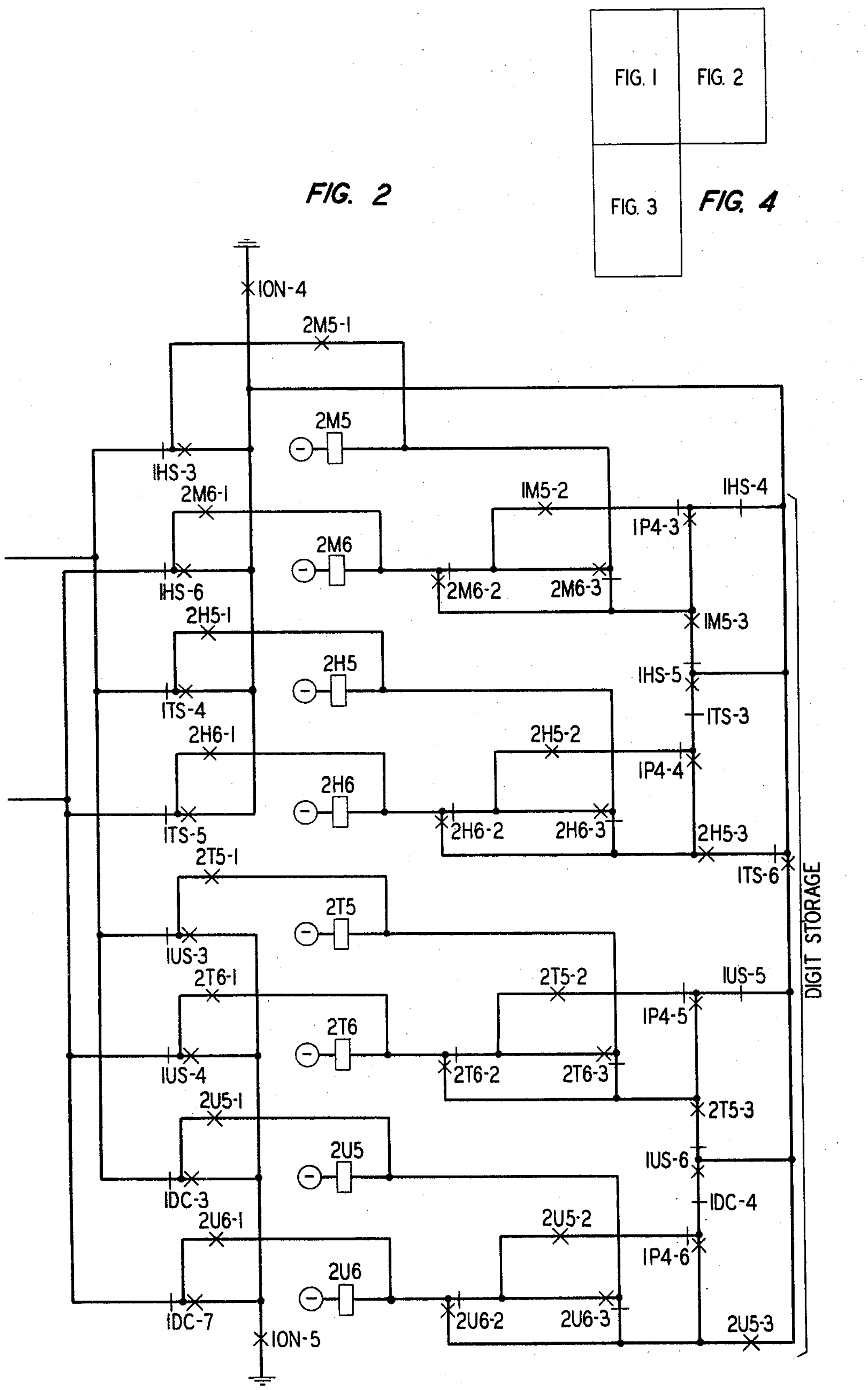
Figure 3:
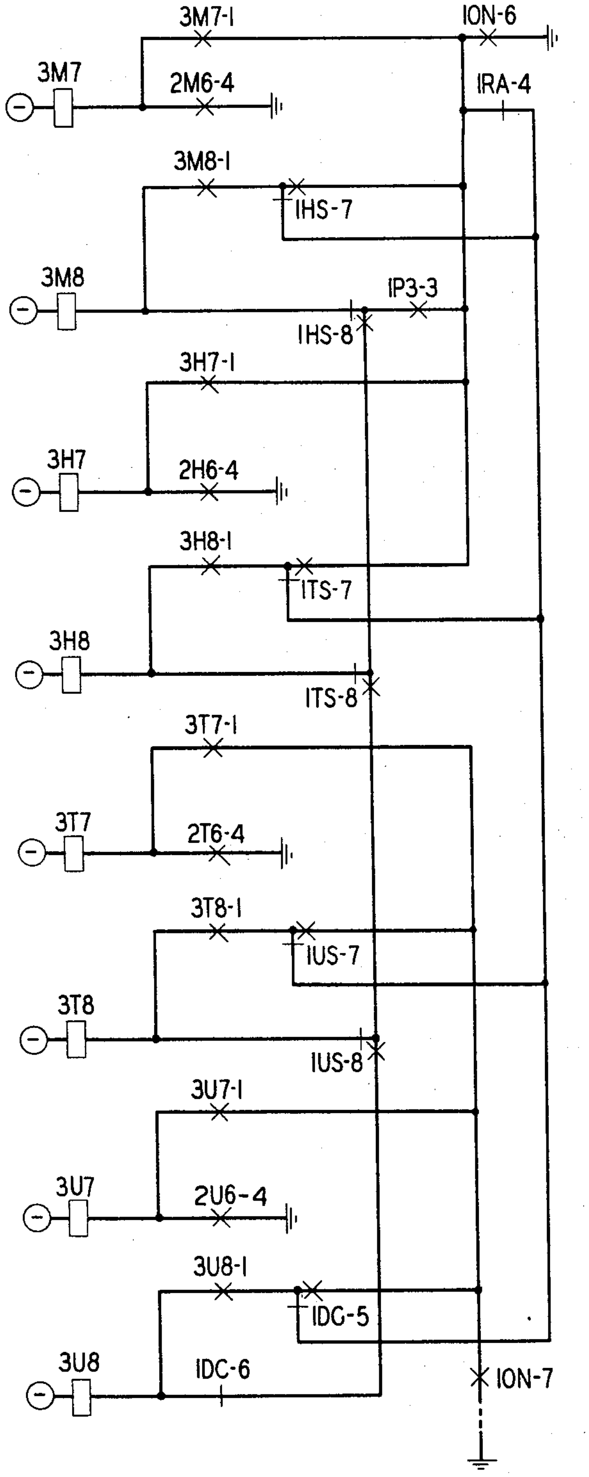
FIG. 3 illustrates the remaining portion of the digit storage stage.

The illustrative embodiment of this invention shown in FIGS. 1–3 is part of common control type switching system such as that shown in U.S. Pat. No. 2,585,904 which issued on Feb. 19, 1952 to A. J. Busch. That portion of a conventional dial pulse register circuit which directly responds to pulses received on a network connection is reproduced in FIG. 1 in sufficient detail to describe the operation of the instant invention. It is shown at the top of FIG. 1 outlined by a double lined box. Relay 1L is the so-called line pulsing relay which is held by the station loop and it releases in response to each pulse of a pulse train. Relay 10N is an off-normal relay initially operated by relay 1L and, because of its slow release characteristics, maintained in an operated condition so long as the register receives a supervisory signal from the originating circuit, e.g., station circuit. Relay 1RA and its slave relay 1RA1 remain operated during each pulse train to indicate the beginning and end of the pulse train. As shown, relay 1RA and its slave 1RA1 operate when relay 1L releases and it remains operated while relay 1L responds to each dial pulse by virtue of a shunted winding which slows its release. For additional details on the operation of these register circuit relays, it is recommended that the aforementioned Busch patent be consulted.

When a station receiver is lifted off-hook, the corresponding line circuit signals the common control circuit (not shown) and indicates a service request. This action results in the originating station being connected to a dial tone register via the switching network. When the station bridge (not shown) is cut through via the network to the register circuit, line relay 1L operates completing a path for receiving dial pulses and for sending a dial tone signal to the calling station. This initial connection is customarily identified as a dial tone connection.

The register circuit of the present invention comprises a pulse counting circuit which is shown on FIG. 1 and consists of relays 1P1 through 1P4. As explained in detail hereinafter, these relays are combined with storage relays to form a unitary decimal pulse counter. The combined circuitry is under control of the rotary dial pulses repeated by contact 1L-2 shown near the top center of FIG. 1. This contact is labeled "pulsing contact". Transfer contact 1L-2 operates and releases in response to each pulse in a pulse stream which taken as a unit represents a single digit.

FIGS. 2 and 3 disclose the digit storage relays 2M-, 3M-, 2H-, 3H-, 2T-, 2U-, and 3U-. Relays 2M- and 3M- form the thousands digit storage unit. Similarly, relays having the letters H-, T-, and U- in their designations are respectively storage units for hundreds, tens and units digits. Initially, that is, prior to receipt of the pulse train, relays 2M5, 2M6, 3M7 and 3M8 are combined with the counter relays 1P1 though 1P4 (FIG. 1) to form the unitary pulse counter. As will be explained hereinafter, this combined circuit responds to the pulses of a pulse train and simultaneously records the dialed digit upon the thousands storage relays.

When pulses are counted by the combined circuitry, and recorded on the storage unit, the steering circuitry shown on FIG. 1 and comprising relays 1AS, 1BS, 1HS, 1TS and 1US separates the digit storage relays from the counter relays. The steering relays are essentially under control of register relays 1RA and 1RA1 which, it will be recalled, remain operated during the pulsing interval.

When all digits have been registered in the digit storage relays, relay 1DC shown at the bottom right hand corner of FIG. 1 operates for indicating the completion of the dialing cycle and controlling the transmission of a signal to the common control circuit, e.g. marker. This latter signal is a request for the establishment of a connection between the calling station and the trunk or station indicated by the dialed code. When the common control circuit is available to serve this request, the information stored on the digit storage relays is transmitted to the marker for call processing. After the common control circuit has functioned to complete the call to the desired station, it forwards a release signal to the register which will release from the switching network releasing relays 1L and 1ON causing the release of all counter, steering and storage relays which were operated during the dial tone connection.

DETAILED DESCRIPTION

DIAL PULSE COUNTING AND STORAGE

Considering now the operation of the counter and storage relays in greater detail, prior to the receipt of the first digit relay 1L is operated and relays 1RA and 1RA1 are released. In addition, none of the relays in the counter, storage or steering stages are operated. Upon the receipt of the first pulse of the first digit relay 1L releases and relays 1P1 and 1P3 are operated. A path for operating relay 1P1 may be traced starting at the top center of FIG. 1 from ground through the break pulsing contact of transfer contact 1L-2, make contact 1ON-2, break contact of transfer contact 1P2-2 to the winding of relay 1P1. A path for operating relay 1P3 may be traced from its winding through a break contact of transfer contact 1P4-2 and make contact of transfer contact 1P1-3 (now operated), make contact of trransfer contact 1RA1-2, and contact 1ON-3 to ground. When relay 1L reoperates at the end of the first pulse, relay 1P2 operates. The path for operating that relay may be traced from its winding through break contact of tranfer contact 1P2-1, and contacts 1P1-1, 1RA-3 and 1L-2 to ground. In operating. relay 1P2 locks up over a different path and transfers the holding path for relay 1P1 at contacts 1P2-2 to the path just described. The holding path for relay 1P2 may be traced from its winding via contacts 1P2-1, 1ON-2, 1P1-2, 1RA1-1 and 1ON-3 to ground on lead A.

Upon the receipt of the second pulse, relay 1L again releases, releasing relay 1P1 and operating relay 1P4. Relay 1P1 releases when pulsing contact 1L-2 opens its holding circuit. A path for operating relay 1P4 may be traced from its winding through contact 1P4-1, 1P3-1, 1P1-3 (not released), contact 1RA1-2, and contact 1ON-3 to ground. When relay 1L reoperates at the end of the second pulse, relay 1P2 is released by virtue of the fact that contact 1P1-2 is open and ground is removed when pulsing contact 1L-2 reoperates. When relay 1L releases upon receipt of a third pulse, relay 1P1 reoperates over the same path described on receipt of the first pulse and the holding path at contact 1P1-3 is opened releasing relay 1P3. When relay 1L reoperates at the end of the next pulse interval, relay 1P2 reoperates over a path previously discussed in connection with reoperation of relay 1L at the end of the first pulse. When relay 1L releases at the beginning of the fourth pulse, relays 1P1 and 1P4 release. When relay 1L again reoperates, remaining relay 1P2 releases. At the end of the fourth pulse, none of the relays 1P1 through 1P4 are operated. The end of the fourth pulse completes a cycle for counter relays 1P1 through 1P4. Thus, upon receipt of the fifth pulse relays 1P1, 1P2 and 1P3 are reoperated as upon the receipt of the first pulse.

The following table shows the 1P- relays remaining operated after each digit.

TABLE A

| Digit Dialed | Relay Remaining Operated |
|---|---|
| a | 1P1, 1P2, 1P3 |
| 2 | 1P3, 1P4 |
| 3 | 1P1, 1P3, 1P4 |
| 4 | None |
| 5 | 1P1, 1P2, 1P3 |
| 6 | 1P3, 1P4 |
| 7 | 1P1, 1P2, 1P4 |
| 8 | None |
| 9 | 1P1, 1P2, 1P3 |
| 0 | 1P3, 1P4 |

It is noted that there is no discrete state of operated relays for all possible digits. As may be seen from the above table, for example, relays 1P1, 1P2 and 1P3 remain operated if the digits 1, 5 or 9 are dialed. Thus, the counter circuit is in fact only a partial decimal counter. As will be seen, the remaining circuitry which creates a unitary decimal counter comprises the storage relays.

Table B below describes which ones of the storage register relays are operated following the receipt of each digit. Only the last numeric of the designation of these register relays is given but the full designation can be simply determined if it is recalled that the relays having the letter -M- in their designation correspond to thousands storage registers, and that the -H-, -T-, and -U- designated relays, respectively, correspond to hundreds, tens and units registers. Each digit register consists of four relays which, for example, are designated in the thousands register as 3M7, 3M8, 2M5 and 2M6. Deleting the first numeric and the letter leaves us with four relays in each register whose designations end with the numerics _5, _6, _7 and _8.

Table B

| Digit Dialed | igits Register Relays Operated |
|---|---|
| 1 | _8 |
| 2 | _5, _8 |
| 3 | _5 |
| 4 | _5, _6, _7 |
| 5 | _5, _6, _7, _8 |
| 6 | _6, _7, _8 |
| 7 | _6, _7 |
| 8 | _7 |
| 9 | _7, _8 |
| 0 | _5, _7, _8 |

Inasmuch as the operating paths for each digit register relay depends on which steering relay(s) is operated, let us set forth those relays and consider their operating circuits before discussing the register relays further. The steering circuit is shown at the bottom of FIG. 1 and it will be recalled that it functions to combine the proper storage units with the partial digit counter. It should also be noted that the steering circuit advances successively after each digit has been received in response to the operation and release of relays 1RA and 1RA1. Table C below shows the operated steering relays after the thousands, hundreds, tens and units digits have been received.

Table C

| Digits Completed | Relays Remining Operated |
|---|---|
| Thousands | 1AS, 1BS, 1HS |
| Hundreds | 1HS, 1TS |
| Tens | 1AS, 1BS, 1HS, 1TS, 1US |
| Units | 1HS, 1TS, 1US |

When the first pulse train is received, relays 1RA and 1RA1 operate establishing operating paths for relays 1AS and 1HS. The winding of relay 1AS connects to ground via break contact of transfer contact 1BS-2, operated contact 1RA2-3 and 1ON-3 to ground. The winding of relay 1HS connects via its own contact, operated contacts 1AS-3, 1RA1-4, and contact 1ON-3 to the ground circuit described above. At the end of the pulse train relays 1RA and 1RA1 release operating relay 1BS via contacts 1AS-1 and 1RA1-3 to the ground circuit. Relay 1AS releases when relay 1RA1 reoperates on receipt of the hundreds digit. In releasing, contact 1AS-3 closes an operating path for relay 1TS. When relay 1RA1 releases, relay 1BS releases. On receipt of the tens digit, operating paths for relays 1AS and 1BS previously discussed are re-established as well as an operating path for relay 1US via contacts 1TS-2 and 1AS-4.

The receipt of the units digit causes the release of relays 1AS and 1BS in a manner similar to that described upon receipt of the hundreds digit. Contacts of the relays remaining operated furnish a path to operate relay 1DC which signals the marker that dialing is complete. This path may be traced from its winding via contacts 1DC-1, 1US-2, 1AS-4 (released) and 1RA1-4 to the ground circuit.

The stage is now set to return to the operation of the register relays utilizing advantageously the three tables presented above. These tables properly combined present sufficient information to develop all of the operating paths for any register (storage) relay. For example, if one desires to know which hundreds digit register relays are operated upon receipt of the digit 2, Table B is consulted. For the digit 2, relays having a designation ending in _5 and _8 are operated. Since we are concerned with the hundreds digit, the operated register relays are designated 2H5 and 3H8. It is noted the first numeric is determined by the drawing figure number on which the relay winding is shown.

If one desires to trace the operating path of these relays, it can be done using Tables A and C. Looking at Table C it is next observed that relays 1AS, 1BS and 1HS of the steering circuit are operated prior to receipt of the hundreds digit. Also note that Table A reveals taht if the digit 2 is dialed, relays 1P3 and 1P4 are operated. Thus, the operating path for relay 2H5 can be traced from its winding via break contact of transfer contacts 2H6-3 (not operated per Table B), make contact of transfer contact 1P4-4 (operated per Table A), contacts 1TS-3 (not operated per Table C) and 1HS-5 (operated per Table C) to ground via contact 1ON1-4. A similar analysis can be made for relay 3H8. It is to be noted, however, for digits above the digit 3, the determination of the operating paths for register relays is determined by considering all intermediate pulses and the operation of each of the register relays at the end of each pulse. This can be done using the Tables as described above. For example, if one wants to determine the operate paths for digit 6 one must consider which of the register relays are operated on the third, fourth and fifth pulses. After referring to Table B, the reason for this will be apparent. Observe for example that on receipt of four pulses register relays _6 and _7 are operated and held operated through the fifth, sixth and seventh pulses.

The dialed digit is encoded on operated ones of the storage relays and they are locked operated at the end of a pulse train over contacts of steering relays. The thousands digit storage relays are locked operated via contacts of relay 1HS as shown to the left hand side of FIG. 2 (e.g., 1HS-3) and in the middle of FIG. 3 (e.g., 1HS-8). Similarly, contacts of relay 1TS (e.g., 1TS-4, 1TS-5) lock the hundreds digit storage relays, contacts of relay 1US lock the tens digit storage relay, and contacts of relay 1DC lock the units digits storage relay.

Reviewing briefly some of the advantages of this invention, it will be appreciated that they all stem from the unique circuit cooperation between the pulse counting stage and the storage stages. As a result, the counting stage is simpler, economical in that fewer elements are required, and more efficient. Furthermore, fewer elements are needed in the storage stages and the interdigital period for resetting these stages is appreciably reduced.

What is claimed is:

1. A pulse counting and digit information storing arrangement responsive to digital information transmitted periodically as pulse trains each of which comprises as many pulses as the digit being transmitted comprising, means including a first plurality of switching elements responsive to successive ones of said pulses of a pulse train for operating said elements, means including a second plurality of switching elements for storing a digit corresponding to said pulse train on operated ones of said second plurality of switching elements, and means operative prior to the receipt of said pulse train for interconnecting said storing means with said operating means to form a unitary decimal pulse counter in which unique combinations of said first and second plurality of elements are operated on receipt of successive ones of said pulses of said pulse train.

2. The invention set forth in claim 1 wherein the arrangement includes a plurality of said storing means each assigned to record a different digit, and said interconnecting means selectively combines particular ones of said plurality of said storing means with said operating means in a predetermined order.

3. The invention set forth in claim 1 further including means interconnecting each of said second plurality of switching elements so as to be responsive to said successive pulses to concurrently encode the digital information contained in said pulse train on operated ones of said second plurality of switching elements.

4. The invention set forth in claim 3 further including means operative after receipt of said pulse train for separating the interconnecting operating means and storing means, and means for releasing operated ones of said first plurality of switching elements and maintaining the operated condition of said second plurality of switching elements.

5. A decimal pulse counting and a multidigit storing arrangement for dial pulse register circuits which responds to digit information transmitted in the form of spaced pulse trains, each train having as many pulses as a decimal number being transmitted comprising, means including a plurality of counter elements and responsive to each of said pulse trains for operating a unique combination of said counter elements over a cycle of less than ten consecu-tive pulses, a plurality of storage means each including a plurality of storage elements for storing digit information on operated ones thereof, means for selecting different ones of said storage means prior to receipt of each pulse train, means responsive to said selecting means for operatively interconnecting said storage elements of ones of said plurality of storage means with said plurality of counter elements to form a like plurality of decimal pulse counters with the combined circuitry, and means concurrently operating said counter elements and an interconnected plurality of said storage elements in response to a first pulse train to encode simultaneously on said interconnected plurality of storage elements said decimal number represented thereby.

6. The invention set forth in claim 5 further including means for operating a unique combination of said plurality of counter elements every four consecutive pulses of a pulse train.

7. The invention set forth in claim 5 further including means actuated after receipt of said first pulse train for disconnecting said interconnected plurality of storage elements from said plurality of counting elements, and means for maintaining the operated condition of ones of said last mentioned storage elements until all of said pulse trains have been received and stored.

8. A pulse counting and digit storage arrangement responsive to digital information transmitted periodically as pulse trains each of which comprises as many pulses as the digit being transmitted comprising, first means being operative in response to each pulse of said pulse trains, second means being operative for the duration of each pulse train, a plurality of counter elements con-nected to said first means and being responsive to said pulses for operating a unique combination of said counter elements on four consecutively received pulses, digit recording means including groups of storage elements, each of said groups being assigned to record a different one of said transmitted digits, means under control of said second means for interconnecting the storage elements of a particular one of said groups to said first plurality of counter elements for forming a unitary decimal pulse counter in which unique combinations of both said group storage elements and said first plurality of counter elements are operated on ten consecutively received pulses, said particular group storage elements being concurrently operative for encoding the digital information of a pulse train on operated ones of said group storage elements, and said interconnecting means is responsive to said second means to maintain the operated condition of said particular group storage elements during receipt of successive pulse trains.

9. A dial pulse register circuit for use in a telephone switching system, said circuit comprising a single first pulse counting stage comprising a plurality of pulse counting relays, a plurality of subsequent pulse counting stages each comprising a plurality of storage relays, and steering means for forming a plurality of discrete decimal pulse counters by coupling, one at a time, each of said subsequent pulse counting stages to said first pulse counting stage, each of said counters being capable of counting dial pulses of a digit only when the stages thereof are interconnected.

10. A dial pulse register circuit in accordance with claim 9 further including a first contact network operating said first pulse counting stage in response to a pulse train, a second contact network consisting of contacts of said pulse counting relays interconnecting the windings thereof, and said first and second networks cooperate to operate unique combinations of said pulse counting relays cyclically on four consecutive pulses of said pulse train.

11. A dial pulse register circuit in accordance with claim 9 further including means operative after receipt of a pulse train by one of said plurality of said defined pulse counters including a specific one of said subsequent pulse counting stages for separating said first pulse counting stage from said specific subsequent pulse counting stage, means for releasing said pulse counting relays, and means for maintaining the storage relays of said specific subsequent counting stage operated.

12. A dial pulse register circuit in accordance with claim 11 further including a contact network composed of contacts of said first pulse counting stage and of said steering relays for interconnecting the windings of relays in said first pulse counting stage and ones of said subsequent pulse counting stages, and a unique combination of said storage relays is operated on each of ten consecutive pulses.

13. A dial pulse register circuit in accordance with claim 11 further including a relay operated for the duration of said pulse train whose contacts are incorporated into said releasing means, and said maintaining means includes a contact network composed of contacts of said steering relays.

* * * * *